Patented Jan. 24, 1928.

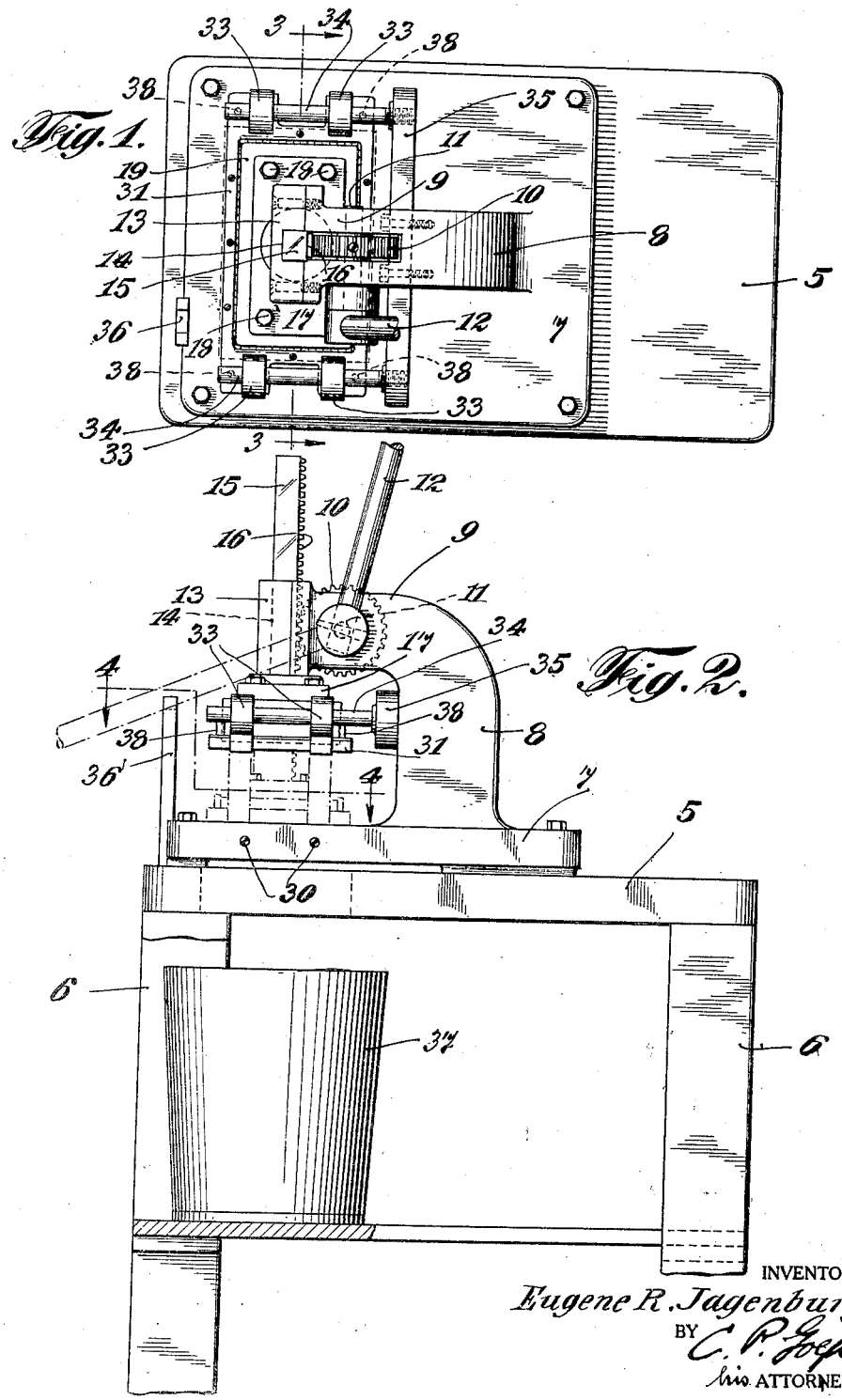

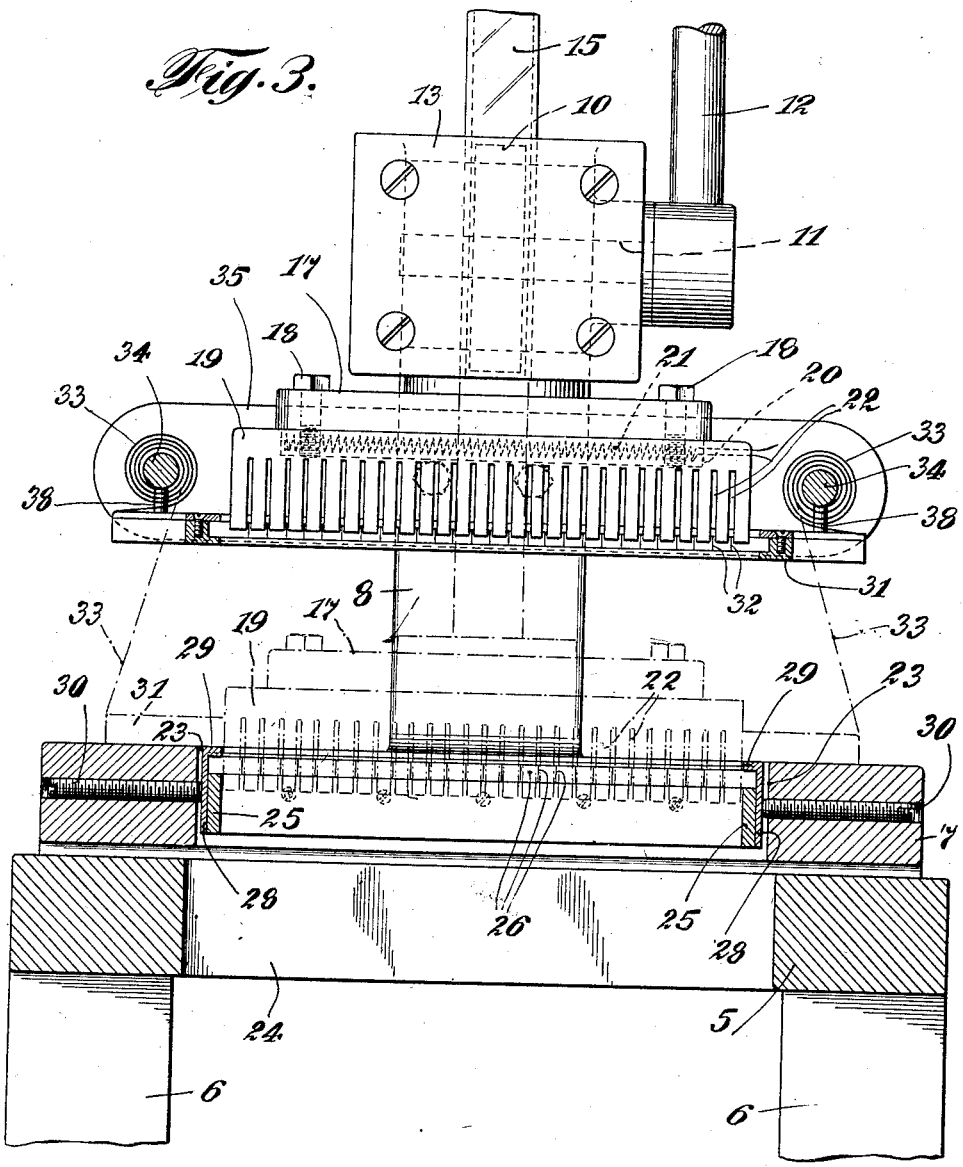

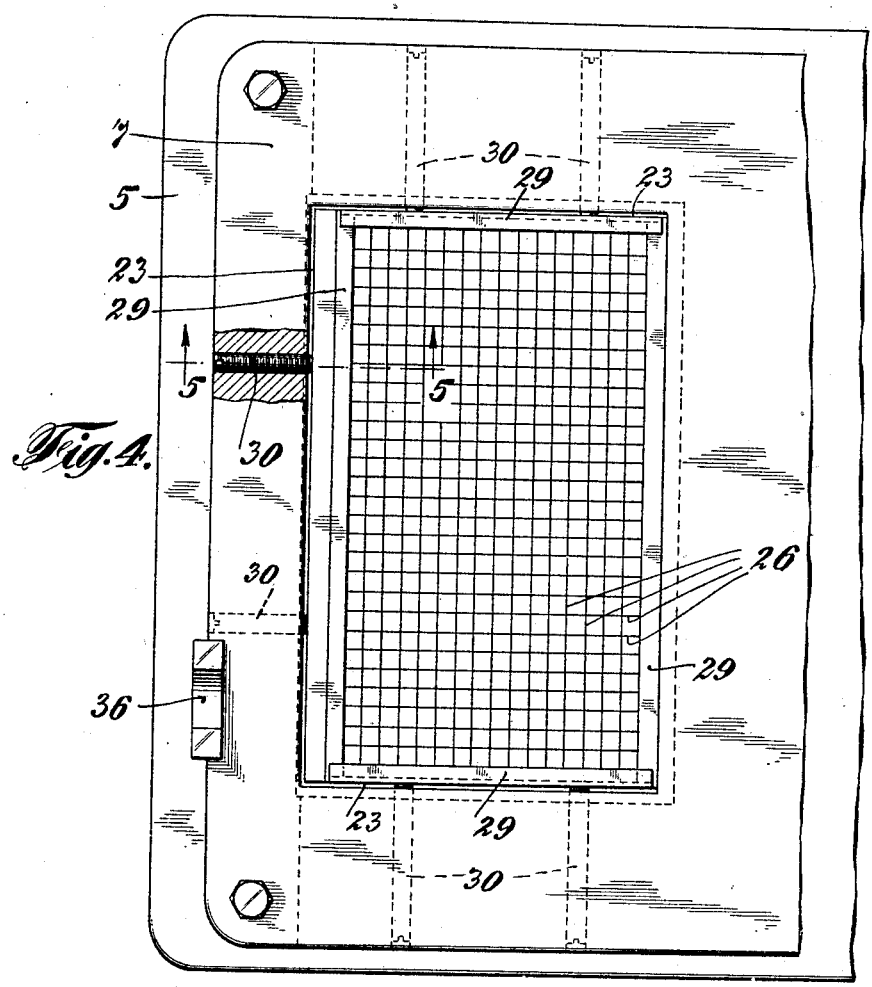
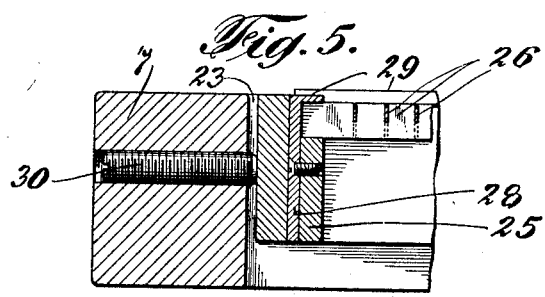
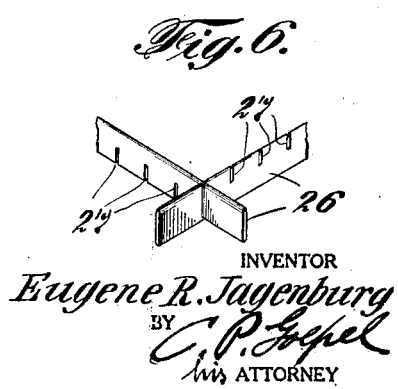

1,657,213

UNITED STATES PATENT OFFICE.

EUGENE R. JAGENBURG, OF DOUGLASTON, NEW YORK.

FRUIT-CUTTING MACHINE.

Application filed January 27, 1926. Serial No. 85,451.

This invention relates to fruit cutting machines, and has for its primary object to provide a machine of relatively simple construction whereby different varieties of fruits such as citron and other heavily candied fruits such as are commonly used as centers for candies or in cake baking may be cut or divided into particles of substantially uniform size and shape.

It is one of the important features of my present improvements to provide a novel mounting and arrangement of intersecting cutting knives whereby in the event that any one of the knives should be broken, it can be easily and quickly removed and replaced by a new knife.

It is also an object of the invention to provide a machine for the above purpose embodying a vertically movable plunger or presser head having intersecting grooves or kerfs therein to receive the cutting knives and means associated with said presser head and automatically operated in the movement thereof to remove such particles of fruit pulp as may collect in said grooves.

It is also an important feature of my present improvements to provide means whereby the knife blades may be heated in order to insure the easy cutting of heavily candied fruits, such as citron, without distorting or breaking the knife blades.

With the above and other objects in view, the invention consists in the improved fruit cutting machine and in the form, construction and relative arrangement of its several parts as will be hereinafter more fully described, illustrated in the accompanying drawings, and subsequently incorporated in the subjoined claims.

In the drawings wherein I have disclosed a simple and practical embodiment of the invention, and in which similar reference characters designate corresponding parts throughout the several views,—

Figure 1 is a top plan view showing a fruit cutting machine embodying one form of my present improvements;

Fig. 2 is a side elevation thereof;

Fig. 3 is a sectional view taken substantially on the line 3—3 of Fig. 1;

Fig. 4 is a horizontal section taken substantially on the line 4—4 of Fig. 2;

Fig. 5 is an enlarged detail sectional view taken on the line 5—5 of Fig. 4, and Fig. 6 is a fragmentary detail perspective view of two of the interlocked intersecting knife blades.

The machine as illustrated in the accompanying drawings, is suitably mounted or secured upon a table top 5 supported by the legs or pedestals 6 and includes a base 7 having a standard 8 adjacent one of its ends. The upper end of this standard is laterally curved or horizontally extended as at 9 and is bifurcated to receive the gear or pinion 10 fixed upon the shaft 11 journaled in said standard. One end of this shaft is provided with a suitable operating lever shown at 12. However, it will be understood as the description proceeds, that in so far as the novel features of the present disclosure is concerned, other operating means than the hand lever for this gear or pinion 10 might be provided.

To the end of the horizontal extension 9 of the standard 8 a suitably formed guide member 13 is secured and is provided in its inner face with a channel 14 receiving the vertically movable rack bar 15, the teeth 16 of which are in constant mesh with the teeth of the pinion 10. The rack bar 15 at its lower end is provided with a plate 17 fixed by the screws 18 to a presser head 19. The upper portion of this presser head is preferably provided with a cavity or chamber indicated at 20 which receives an electrical resistance unit or grid 21 through the medium of which said presser head may be heated. Below this chamber 20 the presser head is formed with a multiplicity of intersecting grooves or kerfs 22 which correspond in number and arrangement with the fruit cutting knives to be later referred to and as shown in Fig. 4 of the drawings.

Below the presser head, the base 7 of the machine is provided with a rectangular opening 23 therein which is positioned above a similar opening 24 in the table top 5. Within this opening 22, the knife carrying frame 25 is adapted to be arranged. The knife blades 26 are arranged in intersecting relation to each other, the blades which extend in one direction having slots 27 in their upper edges and the blades which extend at right angles thereto, having the slots 27 in their lower edges so that the blades are interlocked with each other in a manner well known in the art. These intersecting knife blades have their ends positioned upon the side and end bars constituting the frame 25 as indicated in Fig. 3 of the drawings, and for the purpose of detachably retaining said blades in connection with the frame, I provide a metal plate 28 engaged against the outer side of each frame bar and having an angularly disposed flange 29 on one edge thereof to extend inwardly over the upper edges of the knife blades at their ends. In order to rigidly hold this knife carrying frame in fixed relation to the base 7 of the machine I provide clamping screws 30 adjustably threaded in said base at the front side and opposite ends of the opening 23. When the knife carrying frame is arranged in said opening, the rear plate 28 is engaged against the wall of the opening 23 and the end screws 30 are then adjusted to properly center the frame in said opening, after which the screws 30 in the front of the base 7 are adjusted to tightly clamp and rigidly hold the knife frame in position.

For the purpose of keeping the intersecting grooves 22 of the presser head free of fruit pulp, I provide in association with said presser head an automatic combing or cleaning device. As herein shown, this device includes a suitably constructed frame 31 carrying relatively narrow intersecting blades or wires 32 which normally extend into the lower ends of the grooves 22. This frame is yieldingly supported in its normal position by means of two pairs of convolute springs 33, the springs of one pair having one of their ends attached to one end of the frame 31, while the other pair of springs are similarly attached at one of their ends to the opposite ends of said frame. The other ends of these springs are fixed to rods 34 projecting forwardly from the opposite ends of a bar 35 secured to the front side of the standard 8. It may be noted at this point that the grooves 22 in the presser head have a depth which is appreciably greater than the combined width of the cutting blades 26 and the cleaning blades 32.

Having now described the several structural parts of my new machine, its operation may be explained as follows.

With the presser head in the raised or elevated position as shown in Fig. 3 of the drawings, the fruit to be cut is placed upon the upper edges of the intersecting knife blades held in the frame 25. The operator then grasps the lever 12 and moves the same from the position shown in full lines in Fig. 2 to the position shown in dotted lines therein until said lever comes into contact with a suitable stop indicated at 36. In this movement of the operating lever pinion 10 is rotated to move the rack bar 15 downwardly and thereby force the presser head upon the fruit so that the latter will be forcibly pressed downwardly upon the edges of the knife blades and cut into uniform sized particles which pass through the spaces between said intersecting blades and are received in a suitable receptacle 37 arranged beneath the table top 5.

In the initial downward movement of the presser head 19 the frame 31 carrying blades 32 remains stationary until said blades contact with the inner ends of the slots 22 in the presser head. Thereafter the comb frame moves downwardly with the presser head against the action of the springs 33 which are placed under tension as indicated in dotted lines in Fig. 3 of the drawings. When the lever 12 is moved upwardly and returned to its normal position, the presser head 19 is of course raised, and the springs 33 by contracting, cause the comb frame 31 to move as a unit therewith until stop pins 38 on the ends of said frame strike the rods 34 when said comb frame will be held stationary while the presser head continues its upward movement. Thus, any particles of fruit pulp which may collect in the slots 22 of the presser head will be removed therefrom by the blades 32 so that these slots will not become clogged. It will also be noted from reference to the dotted line position of the presser head in Fig. 3 of the drawings, that as the fruit is cut by the knife blades 26, the particles thereof are forced under pressure through the spaces between the intersecting knife blades by the correspondingly shaped parts of the presser head between the intersecting slots 32 thereof, which in the fully lowered position of the presser head extend below the lower edges of the knife blades. Thus, it will be apparent that it is impossible for the spaces between the intersecting knife blades 26 to become clogged with the particles of fruit in the operation of the machine.

In the cutting of citron or other relatively tough and sticky fruits, it has been found that the resistance thereof to the cutting action of the blades 26 is so great under normal conditions as to make it impossible to cut such fruits by these thin knife blades even under the greatest pressure it is possible to apply, the attempt to cut fruits of this nature being attended by the bending or breaking of the thin knife blades. I have found, however, that if the knife blades are heated, they will then readily cut through citron and similar close textured resistant fruits. As a convenient means for heating the intersecting knife blades, I provide the presser head with an electrical resistance unit or grid 21 as above referred to. Prior to placing the fruit upon the knife blades, the circuit is closed through this electrical heating unit so that the presser head 19 will be heated to a comparatively high temperature. The head is then lowered to extend through the spaces between the intersecting knife blades as shown in dotted lines in Fig. 3 and permitted to remain in such position for a sufficient length of time so that the individual knife blades will likewise become heated to a high temperature. The presser head is then raised and the citron or other fruit placed in position upon the upper edges of the knife blades. Upon then operating the machine to cause the presser head to exert a downward pressure on the fruit, it will be found that the knife blades will very easily cut through the fruit without the least injury to said blades.

I have above specifically described one means whereby the cutting blades may be heated. It is, however, to be understood that various other means may be employed for this purpose, and that it is also possible to apply the heating medium directly to the cutting blades instead of indirectly through the presser head as herein shown.

Should any one of the knife blades 26 become damaged or broken owing to the presence of a fruit pit or other foreign substance or from any other cause, it can readily be replaced by a new blade by simply loosening the clamping screws 20 and removing the frame 25 from the opening in the base 7. The retaining plates 28 can then be detached and the damaged blade separated from the others and the new blade inserted in place since there is no positive fixed connection between the two series of intersecting blades and the frame 25. The frame with the knife blades and the retaining plates 28 can then be easily reassembled and again clamped in fixed position with respect to the base 5 by means of the screws 20.

From the foregoing description considered in connection with the accompanying drawings, the construction, manner of use and several advantages of my improved fruit cutting machine will be clearly and fully understood. It will be appreciated that the machine will be easily operated with a minimum of physical exertion to rapidly cut up various fruits into smaller particles of the requisite uniform size for use by confectioners and bakers in candies and other products. It will, of course, be apparent that the machine may be provided with interchangeable presser heads and intersecting series of cutting knives with said knives and the grooves in the presser head in relatively different spaced relation so that the fruit particles can be of selected predetermined sizes. I have herein shown an embodiment of my present improvements which I have found to be highly satisfactory in practical use, but it will nevertheless be understood that the essential features thereof may also be incorporated in various other alternative structures, and I, therefore, reserve the privilege of resorting to all such legitimate changes in the form, proportion and relative arrangement of the several parts as may be fairly embodied within the spirit and scope of the invention as claimed.

I claim:

1. A fruit cutting machine including a movable presser head, a base having an opening therein beneath the presser head, a frame, a plurality of intersecting cutting knives mounted in said frame, said presser head having intersecting grooves to receive said knives, means for removably securing said knife carrying frame in the opening of said base, means for operating said presser head, and means automatically operating to remove pulp from the grooves to the presser head when the latter is withdrawn from engagement with the knives.

2. A fruit cutting machine including a base having an opening therein, a frame, a plurality of spaced fruit cutting elements engaged at their ends upon opposite edges of the frame, means detachably secured to the outer face of the frame and having inwardly projecting parts extending upon said ends of the cutting elements to removably secure the latter in place, and means mounted in the base for removably securing the knife carrying frame in operative position within the opening in said base.

3. In a fruit cutting machine, a base having a standard thereon, a vertically movable presser head and operating means therefor mounted on the standard, a plurality of intersecting knife blades mounted in the base below said presser head, said presser head having intersecting grooves therein to receive said knife blades, and a combing device movable with the presser head and operable upon the return of said presser head to normal position to remove fruit pulp collecting in the grooves thereof.

4. In a fruit cutting machine, a base having a standard thereon, a vertically movable presser head and operating means therefor mounted on the standard, a plurality of intersecting knife blades mounted in the base below said presser head, said presser head having intersecting grooves therein to receive said knife blades, a yieldingly supported combing device having intersecting elements entering the grooves in said presser head and moved downwardly by the presser head upon contact of said elements with the inner end walls of said grooves, and means limiting the return movement of the comb in the upward movement of the presser head to its normal position whereby said elements of the comb automatically remove fruit pulp collecting in the grooves of the presser head.

5. In a fruit cutting machine, a base having a standard thereon, a vertically movable presser head and operating means therefor mounted on the standard, a plurality of intersecting knife blades mounted in the base below said presser head, said presser head having intersecting grooves therein to receive said knife blades, a comb comprising a frame, intersecting elements in said frame extending into the respective grooves of the presser head, springs connected to the opposite ends of said frame, said frame being moved downwardly against the action of said springs by the engagement of the presser head with said elements, and means limiting the return movement of the comb to its normal position during the upward movement of said presser head whereby said elements automatically remove fruit pulp collecting in the grooves of the presser head.

6. A fruit cutting machine including a base having an opening therein, a frame, a plurality of intersecting knife blades having their ends engaged upon one edge of said frame, plates engaged against the outer sides of the frame and having flanges extending over the ends of said knife blades, and clamping screws mounted in the base to engage said plates and rigidly clamp the knife carrying frame in fixed position within said opening in the base.

7. A fruit cutting machine including a base having a standard thereon, a vertically movable presser head and operating means therefor mounted on the standard, a plurality of intersecting cutting blades mounted in the base, said presser head having grooves therein to receive the cutting blades, and electrical heating means for said presser head whereby, upon lowering said head into engagement with the cutting blades the latter may be heated.

8. In a fruit cutting machine, a plurality of spaced cutting elements, a movable presser head for forcing the fruit under pressure upon said cutting elements having spaced grooves in one face thereof to receive the respective cutting elements, and means for heating said presser head, whereby upon engagement of the head with said cutting elements, the heat from said head is transmitted to said elements.

In testimony that I claim the foregoing as my invention, I have signed my name hereto.

E. R. JAGENBURG.